United States Patent [19]
Garnier

[11] 3,767,882
[45] Oct. 23, 1973

[54] PROCESS AND APPARATUS FOR ANNEALING THE WELD BEAD OF A WELDED METALLIC TUBE
[75] Inventor: Andre Garnier, Aulnoye-Aymeries, France
[73] Assignee: Vallourec Usines a Tubes de Lorraine-Escaut et Vallourec Reunies, Paris, France
[22] Filed: Sept. 14, 1971
[21] Appl. No.: 180,350

[30] Foreign Application Priority Data
Sept. 17, 1970 Luxembourg.......................... 61704

[52] U.S. Cl.............. 219/8.5, 219/10.53, 219/10.79
[51] Int. Cl. .......................................... H05b 5/08
[58] Field of Search............... 219/8.5, 10.43, 10.53, 219/10.71, 10.79, 10.57, 62, 125 PL; 266/4 E, 5 E

[56] References Cited
UNITED STATES PATENTS
3,242,300  3/1966  Osboan............................... 219/8.5
3,265,378  8/1966  Grube et al....................... 219/8.5 X
3,242,299  3/1966  Laughlin et al....................... 219/8.5

Primary Examiner—Bruce A. Reynolds
Attorney—Breitenfeld & Levine

[57] ABSTRACT
An apparatus for treating continuously welded metallic tubes comprises a series of longitudinal inductors mounted on movable carriages which are adapted to be pivotal co-axially with respect to the tube in response to the angular position of the weld bead formed on the tube so that each of the inductors remains centred on this weld bead.

2 Claims, 4 Drawing Figures

PROCESS AND APPARATUS FOR ANNEALING THE WELD BEAD OF A WELDED METALLIC TUBE

The present invention relates to a process and an apparatus for treating welded metal tubes and more particularly welded tubes made of a steel which has a high elastic limit.

In the production of welded tubes from steel, a continuously travelling strip is shaped by sets of suitable rollers into a tube, the edges of which are welded in a welding station. The station can operate for example, by induction with the aid of high frequency currents. It is known that it is necessary to anneal the weld bead so as to ensure that the tube has a uniform elastic limit, this annealing consisting of maintaining the weld bead at a well-established and constant temperature for a particular period. The heating of the weld bead is effected by a series of longitudinal inductors which are centred on the welding line so that the temperature decreases symmetrically on each side of the line. These inductors have to be sufficiently close together and in sufficient numbers for the heating line to be homogeneous and remain at the required temperature for a particular period, allowing for the speed of travel of the tube.

It is known that if the original strip is not perfectly rectilinear, for example, if it is curved as it has a tendency to be, the weld bead is twisted. That is to say, the bead is not situated in the vertical plane containing the axis of the tube at a distance from the welding station. Because of this twisting, which may reach several centimetres over a length of a few metres, the weld bead is disposed outside the heating zone of the last of the series of inductors.

Moreover, the welding generates a temperature gradient which is symmetrical with respect to the weld. This gradient decreases in time, but there is a remanence from the stored heat, which, if twisting occurs and if the inductors are fixed, results in the temperature gradient along a plane perpendicular to the axis of the tube being non-symmetrical after passing beneath the inductors. It follows that the temperature control eyepiece, which if twisting occurs does not sight the weld bead, indicates an incorrect temperature even if the inductors heat a zone covering the displacements of the weld bead homogeneously.

In an effort to overcome this disadvantage, it has already been proposed to displace the inductors horizontally, that is to say in a plane parallel to the plane at a tangent to the upper generatrix of the tube, in order to attempt to keep the heat flux centred on the weld bead. This simple solution is not sufficient once the weld bead is displaced substantially from the upper generatrix of the tube, because the heating becomes a symmetrical and the maximum temperature is no longer centred on the weld bead.

The process according to the invention permits the regular heating of the weld bead, the heating being centred on the weld bead even if a relatively large and variable twisting occurs.

According to the present invention, there is provided a process for annealing the weld bead of a metallic tube which is welded in a welding station whilst travelling continuously therethrough, wherein the welded metallic tube is caused to pass from the welding station beneath a series of longitudinal inductors which are centred on the weld bead so as to maintain the bead at an established high temperature for a given time, each of the inductors being arranged on a movable carriage mounted on a fixed support so as to be pivoted coaxially with respect to the tube, the angular position of each of the carriages being adjusted in respect to the angular position of the part of the weld bead which is about to pass beneath the corresponding inductor, whereby the inductor is centred on the weld bead despite twisting of the tube.

According to one embodiment of the invention, the remanence of the temperature gradient resulting from the heat stored in the metal at the time of welding is utilised as a control parameter to control the angular position of each carriage. More specifically, the temperatures on opposite sides of the part of the weld bead which is about to pass beneath the inductor carried by the particular carriage are measured by two temperature measuring devices rigidly mounted on the carriage. The carriage is then positioned so that the measurements effected by these two devices are substantially the same.

Under these conditions, the heating curve of the tube after it emerges from the first controlled inductor remains symmetrical and the resultant gradient before passage of the bead beneath the second inductor can serve for centering the latter. Hence, the progress is by degrees and the different inductors follow the weld bead, even if it follows the form of a flattened sinusoid.

The invention is also concerned with an installation which is suitable for carrying into effect the process as defined above.

According to the present invention, there is provided an apparatus for annealing the weld bead of a continuously travelling welded metallic tube, comprising a plurality of longitudinal inductors which are arranged so as to be disposable in series over the centre of the weld bead of a welded tube leaving a welding station, wherein then the inductors are so positioned, the inductors are adapted to be powered by alternating electrical energy so as to keep the temperature of a weld bead at a predetermined high temperature for a given time, each inductor being fixed on a carriage which is pivotal coaxially with respect to the tube and is mounted on guide means rigidly connected to a fixed stand, the angular displacement of each carriage being controllable by a motor which is actuatable in the event of there being a difference between the angular positions of the respective inductors and the part of the weld band which is about to pass therebeneath, to reduce the said difference.

Referring to the accompanying drawings:

FIGS. 1 and 2 show a station for annealing the weld bead of a tube 1, the tube being welded, for example, by induction along the upper generatrix in a welding station situated upstream with respect to the direction of travel of the tube through the annealing station.

Figure 1:
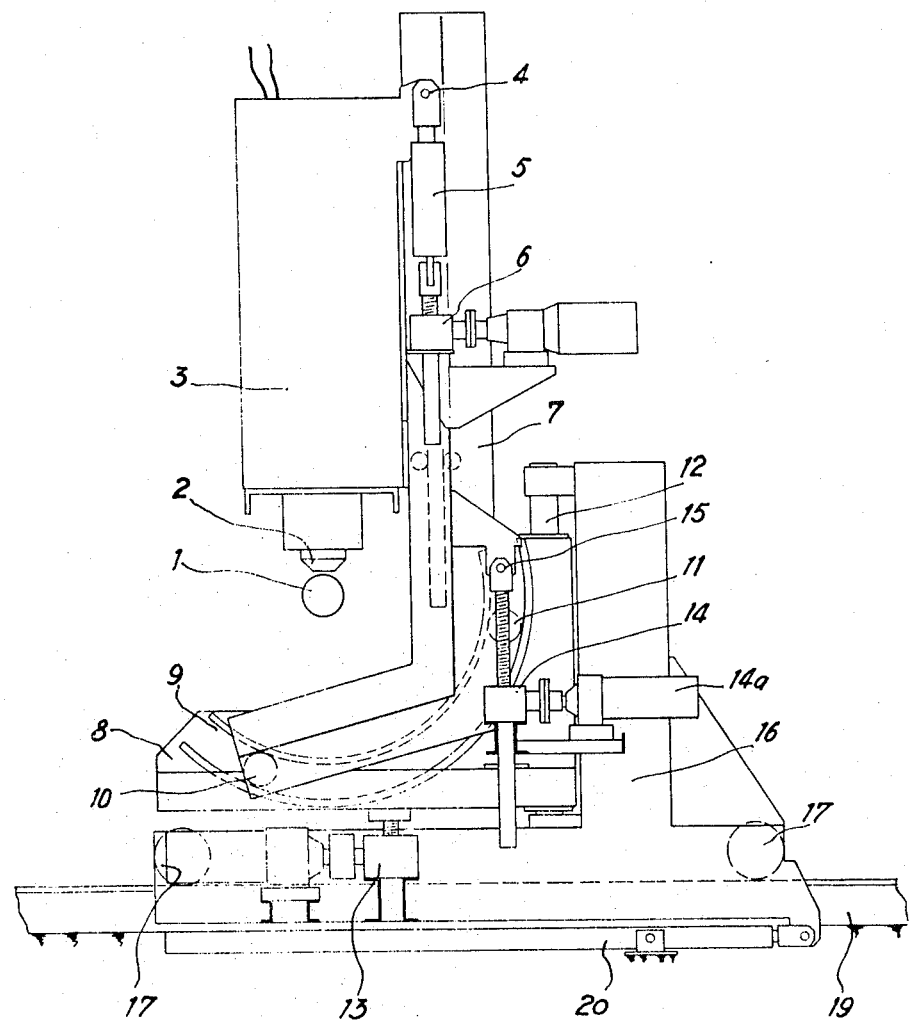
FIG. 1 is an end view of an embodiment of an apparatus according to the present invention.

The annealing is carried out by means of an inductor 2 which is mounted with its equipment in a housing 3 for sliding movement on a carriage 7. The displacement of the assembly comprising the inductor 2 and the housing 3 relative to the carriage 7 can be effected firstly by a screw jack 6 fixed to the carriage and secondly by a hydraulic jack 5 mounted in series with the jack 6 and pivoted at a point 4 on the housing 3.

The screw jack 6 makes it possible, to regulate the gap between the inductor 2 and the tube 1 as a function of the external diameter of the tube when the rod of the hydraulic jack 5 is fully entered.

The hydraulic jack 5 which is mounted in series with the screw jack 6, is intended to provide for the swift removal of the inductor 2 away from the tube 1 in the event of a production difficulty.

The carriage 7 is provided with rollers, such as 10 and 11, which roll in cylindrical tracks 9. These latter form part of a support 8 which slides on slideways 12 under the action of a screw jack 13. Adjustment of the screw jack 13 makes it possible to bring the axes of the cylindrical roller tracks 9 into coincidence with the axis of the tube 1 whatever the tube diameter.

A screw jack 14 is mounted on the support 8 and pivoted at a point 15 on the carriage 7. This jack 14 is actuated by a motor 14a and provides for the displacement of the rollers 10 and 11 of the carriage 7 in the cylindrical roller tracks 9 of the support 8. Thus, the carriage 7 and all the devices which are fixed thereon, and especially the inductor 2, can be turned about the axis of the cylindrical roller tracks 9 and consequently about the axis of the tube 1 which coincides with it.

Hence, the assembly 2, 3, 7 is able to turn on either side of the upper generatrix of the tube 1, so as to maintain the inductor 2 centred on the welding line whatever its displacement during manufacture, the spacing from the tube remaining constant.

Preferably the stand 16, on which the support 8, the carriage 7, the housing 3 and the inductor 2 are mounted can be removed from the production line under the action of a hydraulic jack 20. For this purpose, the stand 16 rests on wheels 17 and 18 which run on rails 19.

Figure 2:
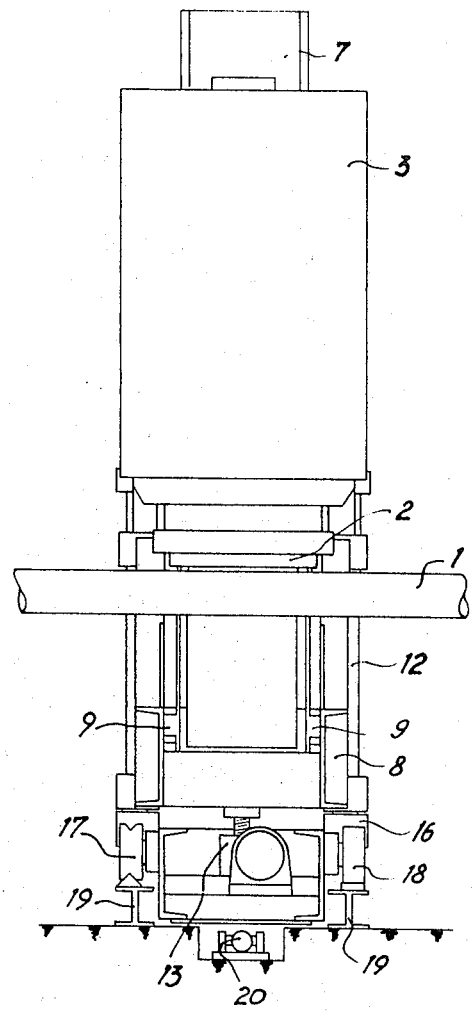
FIG. 2 is a front view of the embodiment shown in FIG. 1.
Figure 3:
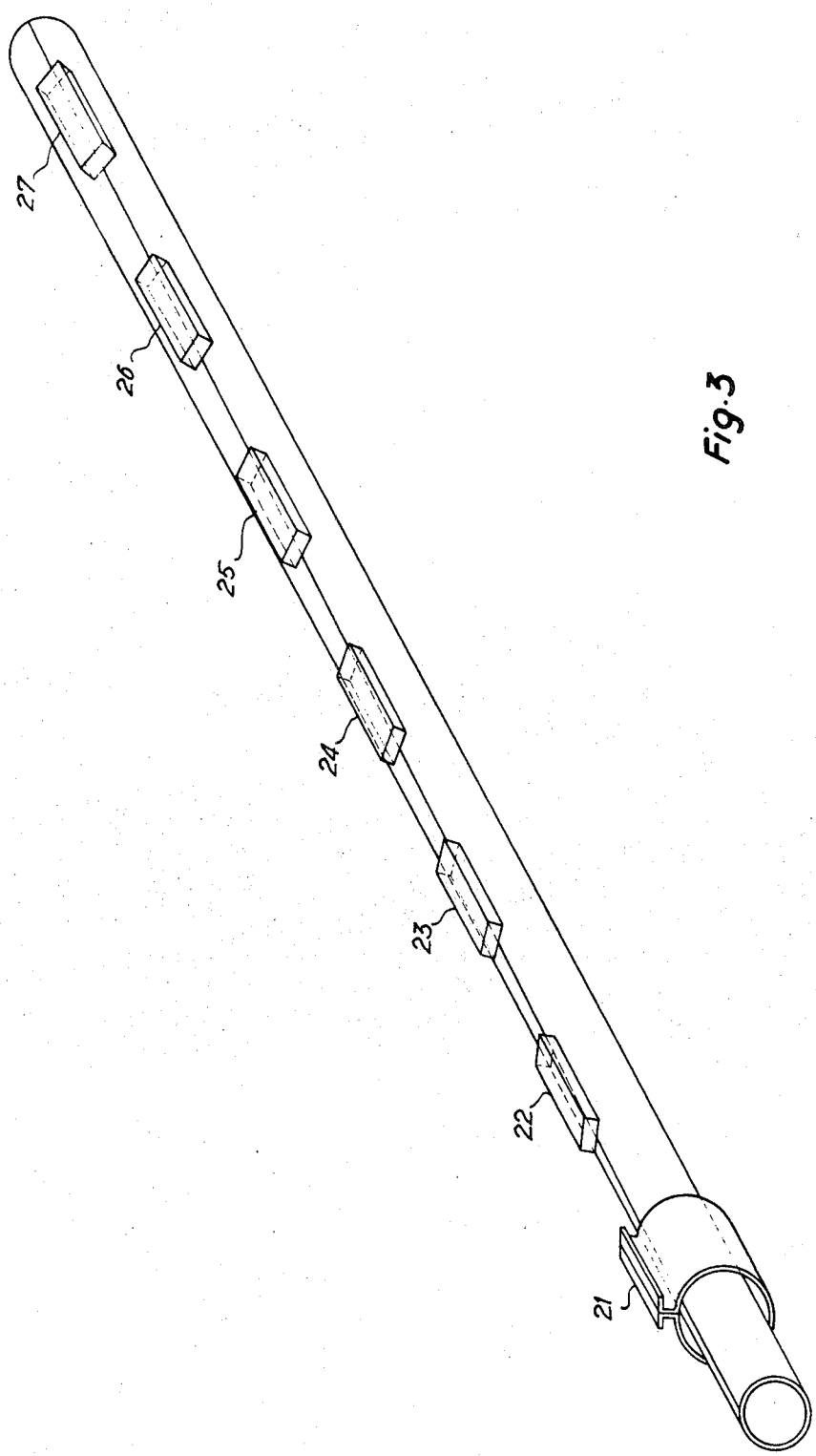
FIG. 3 shows the successive arrangement of the inductors which permits a good annealing of the weld to be obtained.

Generally, a production line will comprise several successive weld bead annealing stations identical with that shown in FIGS. 1 and 2. Such a line is indicated in FIG. 3, in which the high frequency inductor of the welding station is indicated at 21, showing as an example the case in which the weld bead twists towards the right.

The successive heating inductors 22, 23 to 27 turn in the same direction, each of them remaining centred on the weld bead. It is obvious that the number of inductors placed along the weld bead depends on the speed of travel of the tube 1 and the annealing time.

As previously indicated, the angular position of individual inductors is established by the jack 14 and is controlled by the angular displacement of the weld bead at the entry to the individual annealing stations. The actual measuring equipment and also the means permitting the control to be obtained have not been shown, because they are conventional and well known in the art.

Generally, a measuring device which acts on the jack 14 for centering the inductor on the weld bead is positioned upstream from each inductor, and a known pyrometric apparatus which measures the maximum temperature at right angles to the weld bead is also provided. The pyrometric apparatus controls the amount of energy which the inductor delivers to the tube for maintaining the maximum temperature at the correct annealing value.

Figure 4:
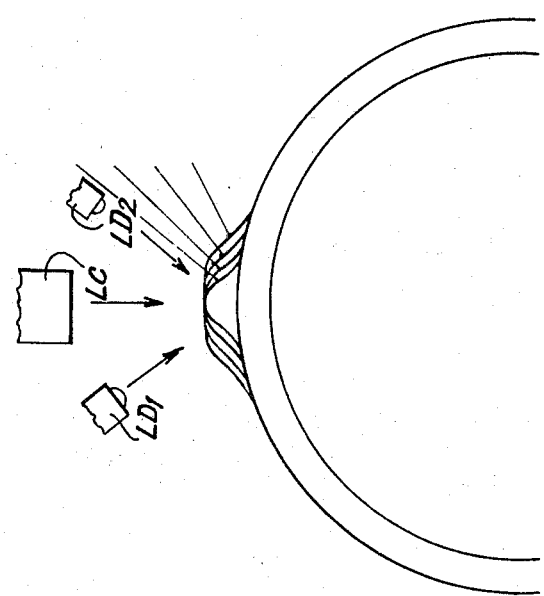
FIG. 4 shows the temperature distribution obtained after welding and passage of the weld beneath the different inductors.

FIG. 4 shows how the heat is propagated on either side of the weld bead during the passage thereof beneath the successive inductors, the temperature maximum remaining constant at a predetermined value and being centred on the weld bead. The position of a measuring device in the form of differential sighting eyepieces LD-1 and LD-2 and the position of a pyrometric control apparatus Lc is indicated.

I claim:

1. Apparatus for annealing the weld bead of a continuously travelling welded metallic tube, said apparatus comprising a plurality of carriages, a plurality of arcuate guides in each of which a carriage is movable so that the angular position with respect to the axis of the tube being annealed can be adjusted, an inductor extending longitudinally of said tube and mounted on each carriage so that its angular position with respect to said tube is adjustable with movement of said carriages, means for supplying alternating electrical energy to said inductor, and a motor to move the carriage with respect to its respective guide.

2. Apparatus according to claim 1 including means for adjusting the position of said guides toward and away from the tube, so that the center of curvature of said guides can be made to coincide with the longitudinal axis of the tube regardless of the diameter of the tube.

* * * * *